Dec. 1, 1970   C. W. HANSEN   3,543,384

METHODS OF COLLIMATOR FABRICATION

Filed Nov. 14, 1966   2 Sheets-Sheet 1

INVENTOR.
CARL W. HANSEN
BY Watts, Hoffmann,
Fisher, & Heinke, Attys.

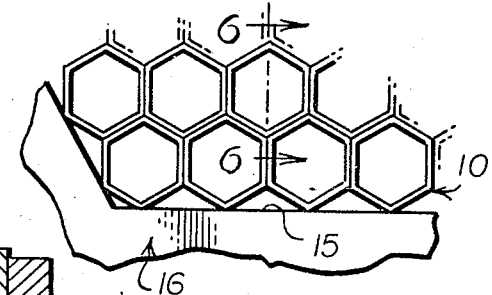
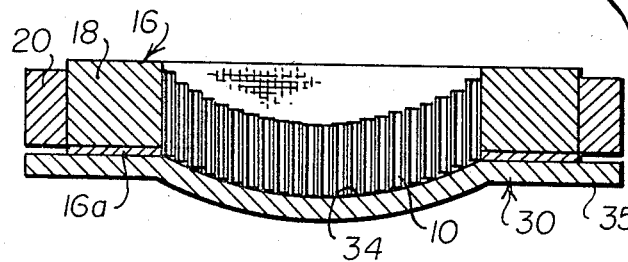
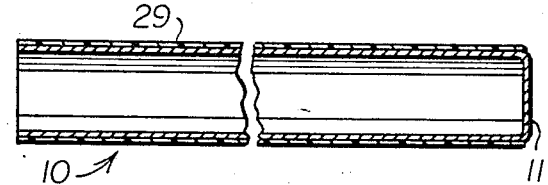
Fig. 4
Fig. 5
Fig. 6
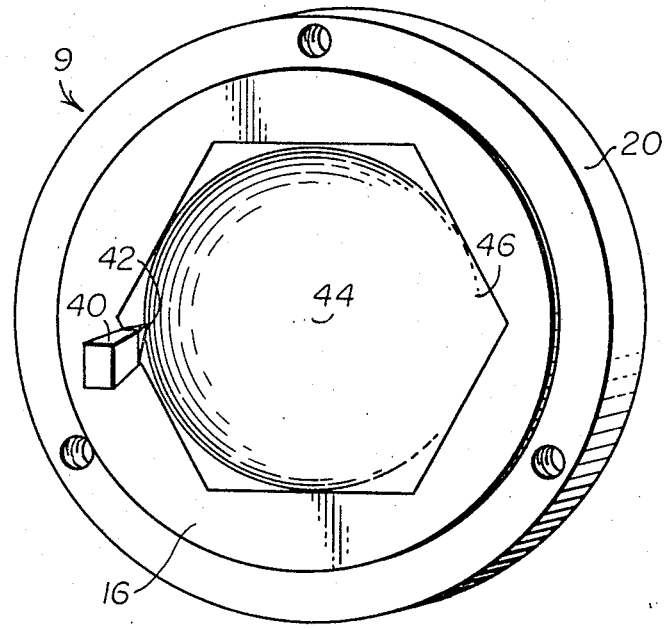
Fig. 7
INVENTOR.
CARL W. HANSEN United States Patent Office
3,543,384
Patented Dec. 1, 1970

3,543,384
METHODS OF COLLIMATOR FABRICATION
Carl W. Hansen, Chagrin Falls, Ohio, assignor, by mesne assignments, to Picker Corporation, White Plains, N.Y., a corporation of New York
Filed Nov. 14, 1966, Ser. No. 594,083
Int. Cl. B23k 31/02
U.S. Cl. 29—471.1                    22 Claims

ABSTRACT OF THE DISCLOSURE

A collimator for nuclear energy imaging devices and method of making collimators including the steps of positioning a plurality of hexagonal tubes in a body, mounting the body and tubes on a mold to achieve the configuration desired, bonding the tubes together and to the body, filling spaces between the perimetral ones of the tubes and the body with radiation-opaque material and machining the collimator.

This invention relates to scintillation cameras and more particularly relates to collimators to be used in combination with scintillation cameras and methods of fabricating collimators.

Radioactive isotopes are used in a variety of medical diagnostic techniques. With some of these techniques, a radioactive isotope is administered to the patient. Later, a study is made of the distribution and concentration of the isotope in the patient. This type of study is of benefit in diagnosing tumors and other physical problems.

Low-energy isotopes may be used in some of these techniques. As used here, a low-energy isotope is considered to be one whose emitted energy is below 150 kev. (kiloelectron volts). If low energy isotopes are used, the distribution and intensity of the administered isotope in a patient may be observed with the aid of an instrument known as a scintillation camera.

A suitable scintillation camera is that described in my copending application for patent Ser. No. 578,617 filed Sept. 12, 1966, under the title Method and Apparatus for Producing an Amplified Image of the Distribution of Gamma Radiation or the Like. This camera includes a multi-hole collimator, an image intensifier, a light amplifier and a specialized television system. The multi-hole collimator absorbs some of the emitted energy from the administered isotope and passes substantially parallel radiation to an entrance window of the image intensifier. The image intensifier forms an intensified image of the spatial distribution of the energy emitted from the observed subject. The television system receives the image from the image intensifier via the light amplifier and displays it on the screen of a television monitor.

The collimator is a body of radiation absorbing material through which a plurality of holes extend. In a collimator for a scintillation camera the holes are preferably parallel. The walls of the collimator that define the holes absorb radiation which is not substantially parallel to the holes. It is desirable for these walls to be as thin as possible to permit the maximum amount of focused radiation to pass through the collimator to the image intensifier. At the same time, the walls must be of adequate thickness to absorb the non-parallel radiation.

Where low-energy isotopes are used, as with a scintillation camera, extremely thin hole-defining walls can be used. At the same time, the holes must be of small diameter to provide good resolution and a large number of parallel holes are required to cover the area of the observed object. As a result, it has been difficult and expensive to fabricate such collimators. For example, one known technique is to cast the collimator of lead. However, the dies necessary for such casting are expensive because of the extensive tooling required to satisfy the exacting requirements for wall thickness and hole diameter. Also, a separate die is required for each different size collimator.

The present invention provides a new and improved, low-cost, collimator and improved methods of fabricating collimators. The invention is primarily concerned with parallel-hole collimators for use with scintillation cameras and low-energy isotopes. A flexible method of collimator fabrication permits a wide variety of collimators to be made with very little tooling. As a result, a full line of optimized collimators of various sizes can be provided with a minimum investment.

In accordance with this invention, a collimator is constructed with thin-wall lead tubes that are hexagonal in cross section and formed by impact extrusion. Impact extrusion is especially advantageous for several reasons. No large investment in dies is required. Also, any number of tubes can be formed for use with different size collimators, and the tubes can be accurately formed to the desired diameters, lengths, and wall thicknesses needed for each size collimator. By way of example, a typical collimator for use with a 9-inch image-intensification tube uses 12,000 impact extruded hexagonal lead tubes .066 inch across (wall to wall), and 1 inch in length. The wall thickness of each tube is .010 inch. Approximately 10,000 of the tubes will occupy positions directly in front of the input window of the image intensifier. The number of the lead tubes can vary for image intensifiers of different sizes and the size of the tubes may vary according to the resolution requirements of the application. This presents some idea of the difficulties and the expense that would be involved in die casting such collimators, especially if different sizes are needed.

In the fabrication of a collimator according to the present invention, a plurality of extruded thin-walled lead tubes are coated with a suitable bonding agent or adhesive such as an epoxy resin, and are stacked within a circular body having a hexagonal central opening. The hexagonal cross section of the collimator tubes enables a maximum number of tubes to be nested in a given opening with uniform amounts of lead between adjacent holes formed by the tubes.

One of the surfaces of the collimator formed by the adjacent ends of the tubes must be placed against the input window of the image intensifier. This surface of the collimator must be curved concave to conform to the curvature of this input window. The opposite surface of the preferred embodiment is also formed to a corresponding convex curvature to keep the tubes all the same length. In contrast, a flat outer surface would require progressively longer tubes toward the peripheral portions of the collimator. This double curvature and uniform tube length has the advantages of providing uniform resolution (resolution being a function of the length and diameter of the tubes), allowing adequate tube length throughout the collimator without exceeding the length limitations imposed by impact extrusion, and permitting the economies of forming and assembling that result from the use of tubes of only one length.

To obtain the proper curvatures on opposite surfaces of the collimator, a curved forming plate is positioned against one end of the assembly of stacked lead tubes. The forming plate has the same curvature as the input window of the image intensifier and locates and holds the tubes in proper position. The collimator is baked with the forming plate in place until the adhesive bonding the tubes together hardens, securing the hexagonal tubes in place. Because the tubes have been impact extruded, one end is closed. This end is located upward during curing, assuring that epoxy or other foreign matter does not enter the holes.

After the assembled collimator is heated to cure the adhesive the concave and convex portions formed by the ends of the tubes are machined. This removes the lead which ordinarily closes one end of tubes formed by impact extrusion and smooths off the other end so that the termini of the tubes at opposite ends form curved surfaces. This is accomplished by mounting the collimator on a lathe and machining the ends. The collimator is rotated in one direction while a cutting tool is moved from a point on the outer periphery of the collimator to the center. The tool is then moved to a diametrically opposite peripheral location and brought to the center as the collimator is rotated in the same direction while a cut is taken from the second point on the outer periphery to the center of the surface. This process is repeated on the opposite surface of the collimator. By machining the surfaces in this manner, both the original flashing and any flashing that may have been formed by the first cut are removed.

Accordingly, it is an object of this invention to provide a new and improved collimator and improved methods of making collimators so that collimators of various sizes can be made with a minimum investment.

Other objects, features and advantages will become apparent and a fuller understanding of the invention will be obtained from the following detailed description when considered in connection with the accompanying drawing in which:

FIG. 4 is a sectional view of a collimator with curved forming plates on opposite sides to position the hexagonal tubes within the collimator frame so that the ends form generally curved surfaces;

FIG. 5 is an enlarged end elevation view similar to FIG. 1, showing the manner in which the hexagonal tubes nest to form holes with uniform wall thicknesses;

FIG. 6 is a longitudinal sectional view of one of the tubes of FIG. 5, taken in the plane of line 5—5 and looking in the direction of the arrows; and FIG. 7 is a perspective view of a collimator diagrammatically illustrating the manner in which the curved surfaces are machined.

Figure 1:
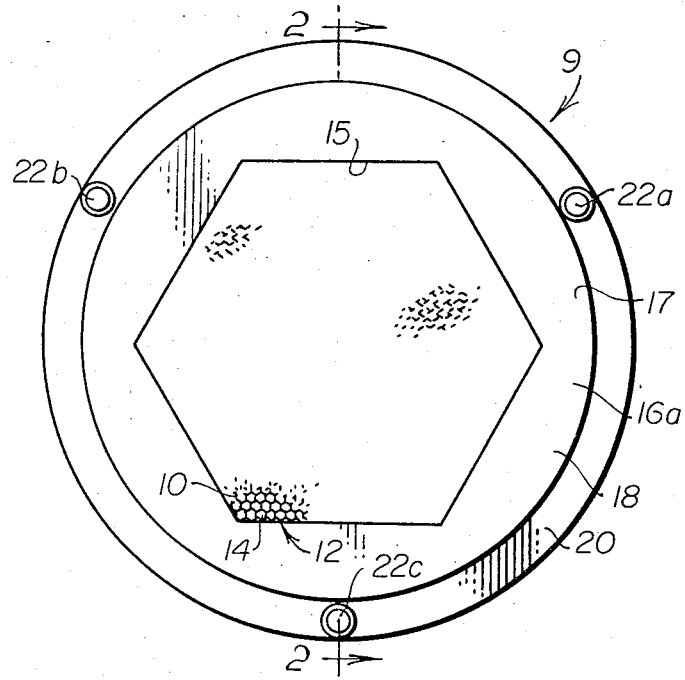
FIG. 1 is an end elevational view of a collimator constructed in accordance with the invention.

In FIG. 1, an elevation view of a parallel tube collimator 9 is shown having a plurality of hexagonal collimating tubes 10 stacked and adhered together to form a continuous honeycomb structure 12 with a plurality of hexagonal passages 14 through which radiation may pass. The honeycomb structure 12 is embedded in a hexagonal opening 15 in a body 16 equipped with a cylindrical lead ring 16a. The ring 16a provides a planar end surface 17. The body 16 also includes cylindrical backup ring 18 of aluminum or the like which is secured to the lead ring 16a. The body 16 is surrounded by a mounting ring 20. The mounting ring 20 includes three mounting screws 22a, b, c, received in threaded bores of the ring for attaching the collimator to an image tube with the honeycomb structure 12 centered over the image tube entrance window.

Figure 2:
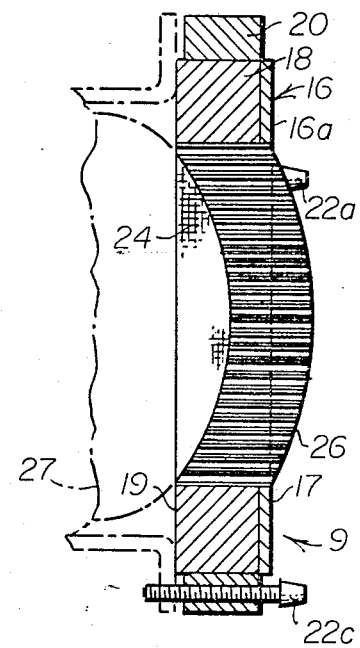
FIG. 2 is a sectional view of the collimator of FIG. 1 taken along section line 2—2 and looking in the direction of the arrows.

In FIG. 2, a sectional view of the collimator is shown taken through section lines 2—2 of FIG. 1. A surface 24 on one side of the honeycomb structure 12 is concave and has a curvature that is the same as the curvature of the entrance window of an image intensifier tube 25 (shown in phantom in FIG. 2) against which it is to be positioned. An opposite surface 26 of the collimator is convex with the same curvature as the surface 24 so that all of the hexagonal tubes 10 are of the same length. The surfaces 24, 26 illustrated in FIG. 2 have already been machined. The curved surfaces 24, 26 of the collimator are circular in plan, corresponding to the configuration of the entrance window of the image intensifier. Several tubes 10 near the outer edge of the honeycomb structure 12 are beyond the curved surfaces 24, 26 of the collimator. Their ends are parallel to each other and coplanar with opposite end surfaces of the cylindrical body 16.

In fabricating the collimator of this invention, the body 16 having the hexagonal interior opening 15 is first fabricated. The mounting ring 20 may be mounted around the body 16 at this time by any suitable means, such as aluminum welding. Alternatively, the ring 20 can be mounted as the final step in the fabrication of the collimator.

Figure 3:
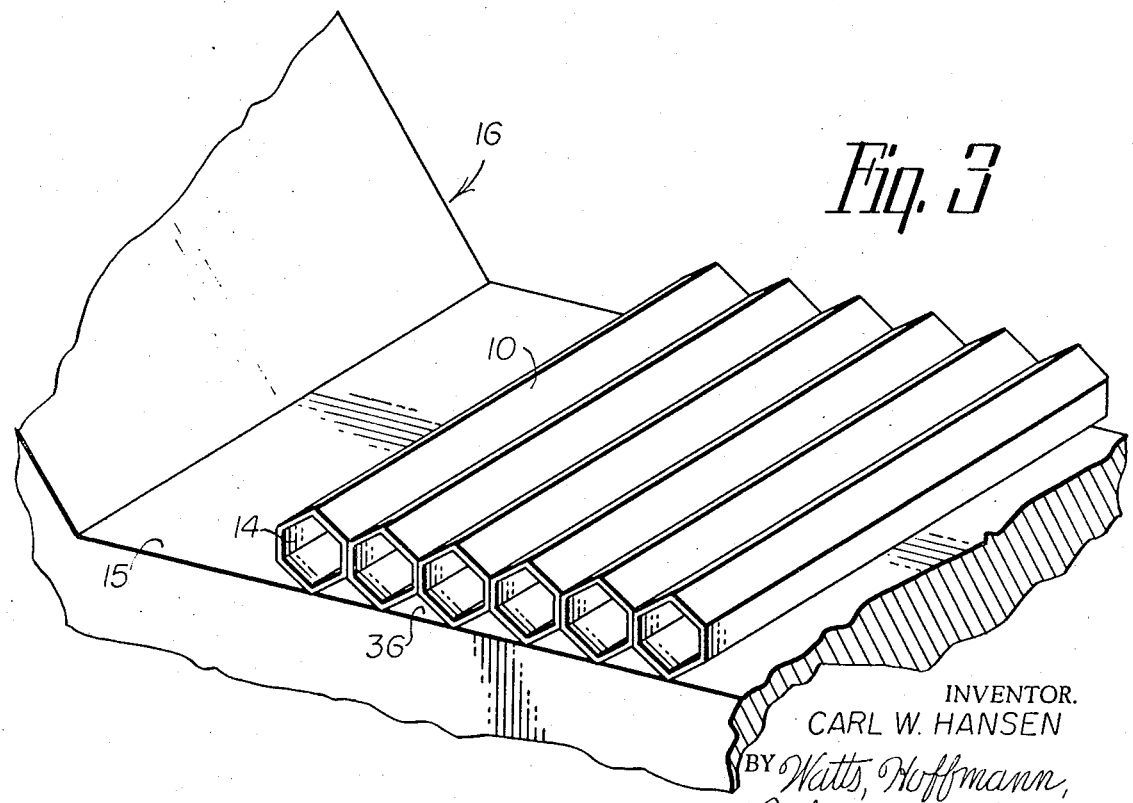
FIG. 3 is an enlarged perspective view of a collimator frame containing only a portion of the tubes, illustrating the manner in which the collimator is fabricated.

Individual hexagonal tubes 10 (see FIG. 6) are impact extruded from lead and cut to a desired uniform length for the particular collimator being fabricated. As shown, the tubes 10 are preferably equal in length to the thickness of the body 16. One end 11 of each tube is closed and all closed ends 11 of the tubes are oriented in the same direction when assembled. The outside wall surfaces of these tubes are coated with a suitable adhesive 29. Epoxy resins or other thermosetting resins are particularly suitable adhesives for bonding the tubes. A suitable epoxy resin is sold by Minnesota Mining and Manufacturing Company under the trademark "Scotch-Cast" No. 3 Epoxy. With the body 16 standing vertically as shown in FIG. 3, the coated tubes are stacked in rows within the hexagonal opening 15.

The tubes 10 are very delicate, making coating and handling difficult. A convenient technique has been developed for overcoming this problem throughout most of the assembling. Groups of tubes are initially placed in the opening 15 of the body 16. A brush dipped in adhesive is then swept across the tube walls, applying a coating of adhesive to and at the same time rolling the tubes into rows, properly nested as in FIG. 5 in honeycomb fashion within the opening 15.

After the opening 15 in the body 16 has been completely filled with the hexagonal tubes 10, a forming plate 30 (FIG. 4) is positioned against one end or face of the collimator. The plate 30 has a concave surface 34 circular in plan and curved to the configuration of the entrance window of the image intensifier with which the collimator is to be used. This surface faces the collimator. An annular flange 35 surrounds the convex surface 34 and provides a flat surface constructed to abut the body 16. After the plate is placed against the face of the body 16, the collimator assembly and plate 30 are clamped together if desired and rotated 90 degrees to place the plate at the bottom. The weight of the tubes 10 causes them to slide in a central circular zone of the honeycomb structure 12 along their axes and into abutment with the concave surface 34.

The collimator with the forming plate 30 in position is then baked for approximately an hour at 100 to 105 degrees centigrade to cure the adhesive. Preferably the assembly is oriented with the tubes closed-ends up so the adhesive will not run out from between the tubes and into the openings. After the collimator has cooled, the forming plate 30 is removed. Any voids in the structure (such as indicated at 36 in FIG. 3) other than the passageways 14 are filled with a suitable shielding material, such as tungsten powder bonded together with a suitable adhesive such as the Scotch-Cast No. 3 Epoxy mentioned above. The assembly is again baked at 100 to 105 degrees centigrade to harden the filling material.

The hexagonal tubes 10 have undesirable lead formations remaining on them at this time. One end 11 of each of the tubes is closed. This is characteristic of impact extruding. There is also an undesirable lead flashing on both ends of each tube. This undesirable material is removed by machining. The machining is facilitated by initially positioning the tubes with their closed ends all in the same one of the surfaces 24, 26 when the honeycomb structure 12 is formed.

Before the surfaces 24 and 26 are machined, the honeycomb structure 12 may be temporarily reinforced, although normally this is not necessary. To provide reinforcement the openings 14 in the hexagonal tubes 10 are filled with a suitable material that is solid at room temperatures but which can be melted and removed without damaging the tubes. Paraffin-base wax materials, such as a material sold commercially by Standard Oil Company (Ohio) under the trademark "Parowax," are especially suitable.

To remove the undesired lead and to shape the ends of the collimator to a smooth curvature, the assembly, including the body 16 and mounting ring 20, is mounted on a lathe and a plurality of cuts are taken along each of the opposite curved ends of the honeycomb structure 12 to form the surfaces 24 and 26. These cuts follow the general curved contour of the surfaces formed by the forming plate 30. It has been found that several cuts are required to form a smooth surface and the number varying according to tube length and alignment variation and the like. Each succeeding cut is taken in a different direction to remove some of the flashing formed by the preceding cut.

The preferred technique is to mount the collimator 9 on a lathe (not shown) in the orientation shown in FIG. 7 with an unfinished surface, such as the unfinished concave surface 24, adjacent to a cutting tool diagrammatically indicated at 40. The collimator is then rotated, for example, in a counterclockwise direction. While it is rotating in a counterclockwise direction, the cutting tool 40 is positioned at a first point 42 near the periphery of the collimator, in contact with the honeycomb structure 12. A first cut is then taken from this first point 42 to the center 44 of the honeycomb structure 12. During all cuts the cutting tool 40 is also programmed to produce the curvature desired, as with a master profile The collimator and tool are next relatively rotated in the opposite direction This is preferably accomplished by rotating the collimator in the opposite direction and positioning the cutting tool 40 at a second point 46 diametrically opposite from the point 42 and the same distance from the center 44 of the structure 12. A second cut is then taken from the position 46 to the center 44 of the honecomb structure 12. These operations are repeated as required to complete the machining of the surface 24 and provide a finished concave curvature corresponding to that of the entrance window of the image intensifier.

The position of the collimator is then reversed on the lathe and similar cuts are taken on the unfinished convex surface 26 but programmed to provide a convex surface of matching curvature.

It can be seen that this method of fabricating a collimator is inexpensive and flexible. It does not require a plurality of carefully tooled dies as would be the case with casting of the honeycomb structure. Standard impact extruders are able to provide tubes of the type used in fabricating this collimator. The tubes are self-stacking within the body 16 because of their weight and hexagonal shape, and the curved surfaces are inexpensively but accurately formed. Collimators of different sizes are made by varying the number of the thin-walled tubes used to assemble honeycomb structure and by casting an appropriate body 16. Only a single extrusion die is needed for each different hole size required.

Although the invention has been described in its preferred form with a certain degree of particularity, it is to be understood that the present disclosure of the preferred form has been made only by way of example and numerous modifications and alterations may be made therein without departing from the spirit and the scope of the invention as hereinafter claimed.

What is claimed is:

1. In a process of making a gamma camera collimator having septa defining a plurality of small parallel holes forming openings for the passage of parallel gamma rays, and with the septa of a thickness and capability of absorbing gamma rays approaching a camera along paths at angles with respect to the hole axes, the steps comprising:
    (a) forming a plurality of thin-walled lead tubes having a plurality of flat walls defining a longitudinally extending hole;
    (b) coating external wall surfaces of the tubes with an adhesive;
    (c) assembling the tubes into a honeycomb-like structure within a supporting frame-like body, essentially filling the body with tubes while orienting the holes in the tubes substantially parallel to one another with the ends of the tubes forming opposite end surfaces of the honeycomb-like structure; and,
    (d) curing the adhesive to bond the tubes together into an assembly.

2. The method of claim 1 including the step of forming all of the tubes to the same length.

3. The method of claim 1 wherein one end of each of the tubes is closed, and including the step of positioning the closed ends of the tubes in the same direction during assembly.

4. The method of claim 1 including the step of shaping one of said opposite end surfaces to a concave contour of a curvature suitable for positioning against an input window of an image intensifier.

5. The method of claim 4 wherein the said one surface is shaped by sliding the assembled tubes axially within the body different distances relative to others prior to curing the adhesive and machining the ends of tubes to remove portions of the tubes after the adhesive has cured.

6. The method of claim 5 including the step of clamping the tubes between forming plates prior to curing the adhesive, and heating the assembly to cure the adhesive.

7. The method of claim 5 wherein the tube ends are machined by mounting the assembly of tubes on a lathe, rotating the assembly about a central axis in a first direction, moving a cutting tool into contact with tube ends at a first position, moving the cutting tool in one direction along a radius between the perimeter and the center of the assembly while programming a path to form a curved surface by the cut, and making a second similar cut by relatively rotating the tool and workpiece in the opposite direction while moving the tool along a radius and programming the tool to the same curved surface.

8. The method of claim 1 wherein tubes are formed by impact extrusion.

9. In a process of making a gamma camera collimator having septa defining a plurality of small parallel holes forming openings for the passage of parallel gamma rays, and with the septa of a thickness and capability of absorbing gamma rays approaching a camera along paths at angles with respect to the hole axes, the steps comprising:
    (a) forming a plurality of tubes of equal length and equal cross-sectional area and formed of walls that absorb radiation;
    (b) arranging said tubes one against the other with their longitudinal axes paralled to form two opposite composite end surfaces;
    (c) connecting said tubes one to the other to form a rigid assembly; and,
    (d) shaping the two end surfaces so that one of said surfaces is concave and the other convex.

10. The method of claim 9 further comprising the steps of
    (e) machining said first and second surfaces to remove end portions of the tubes.

11. The method of claim 1 including forming the tubes to a hexagonal configuration.

12. The method of claim 9 in which the step (c) of connecting said tubes one to the other is accomplished by:
   (i) coating said tubes with an adhesive material;
   (ii) arranging the tubes in a supporting member in side-by-side generally aligned relationship to form a honeycomb structure having two opposite surfaces;
   (iii) placing forming members, one convex and one concave, against said surfaces, which members have curvatures corresponding to the curvature of an image-tube amplifier window area;
   (iv) sliding the tubes of said honeycomb structure to generally conform to the surfaces of said mold; and
   (v) heating the shaped honeycomb structure until such adhesive material has cured, whereby said tubes are rigidly positioned with respect to each other.

13. The method of claim 12 wherein tubes are coated and generally aligned in the supporting member by brushing the tubes with the adhesive material.

14. The method of claim 9 comprising the steps of:
   (e) filling interstices between said tubes with an adhesive material mixed with a radiation absorbing material; and,
   (f) heating said collimator until said adhesive material has hardened.

15. The method of claim 9 including the steps of:
   (e) forming a collimator body having an inner opening with a cross section larger than the cross section of an input window area of a scintillation device;
   (f) forming the tubes from lead in a hexagonal cross-sectional configuration by impact extrusion;
   (g) coating the tubes with a thermosetting resin;
   (h) placing the coated tubes within the inner opening of said collimator body to form a continuous honeycomb structure of tubes having first and second opposite end surfaces;
   (i) positioning the collimator body and honeycomb structure against a forming member, which forming member has a surface that is curved to the curvature of the input window area of the scintillation device;
   (j) attaching said forming member to the body to position the hexagonal tubes with respect to one another to form the two opposite end surfaces curved generally to the curvature of the input window to the scintillation device;
   (k) heating the body with the forming member attached until the thermo-setting material has hardened, whereby the hexagonal tubes are rigidly fixed one to another and to said collimator body;
   (l) removing metal from the said opposite surfaces to shape the tube ends into smooth surfaces of curvature identical to that of the window area of said scintillating device and to provide unobstructed through passageways between said opposite end surfaces.

16. The method of claim 3 wherein the tubes are positioned closed-end up during the curing step.

17. The method of machining the faces of a collimator having holes extending from one face to another comprising:
   (a) mounting the collimator on a lathe;
   (b) rotating the collimator about a central axis in a first direction;
   (c) moving a cutting tool into contact with a face of the collimator at a first position;
   (d) moving the cutting tool in one direction along a radius between the perimeter and the center of the collimator while machining the face of the collimator; and,
   (e) making a second similar cut by relatively rotating the tool and the collimator in the opposite direction while moving the tool along a radius.

18. The method of claim 17 including the step of programming a cutting tool path to form a curved surface as the tool is moved radially relative to the collimator.

19. The method of claim 1 including the step of filling interstices between the perimetral ones of said tubes and the body with radiation-opaque material.

20. The method of claim 1 wherein the formation of the tubes includes forming tubes having walls of hexagonal configuration and holes therein of equal cross section and uniform cross section from end to end.

21. The method of claim 1 including the step of positioning said tubes in positions such that each flat wall of each tube, other than perimetral ones of the tubes, is in juxtaposed relationship with the wall of another of the tubes.

22. The method of claim 9 wherein the tubes have flat walls and including the step of positioning said tubes in positions such that each flat wall of each tube, other than perimetral ones of the tubes, is in juxtaposed relationship with the wall of another of the tubes.

References Cited
UNITED STATES PATENTS

| | | | |
|---|---|---|---|
| 2,499,977 | 3/1950 | Scott | 29—472.3 X |
| 2,828,235 | 3/1958 | Holland et al. | 29—455 X |
| 2,942,109 | 6/1960 | Bell et al. | 250—105 X |
| 3,097,982 | 7/1963 | Stoner | 29—455 X |
| 3,123,907 | 3/1964 | Thomas | 29—455 |
| 3,373,286 | 3/1968 | Han | 250—105 |

JOHN F. CAMPBELL, Primary Examiner

J. L. CLINE, Assistant Examiner

U.S. Cl. X.R.

250—105